(12) United States Patent
Becker et al.

(10) Patent No.: US 10,696,098 B2
(45) Date of Patent: Jun. 30, 2020

(54) PNEUMATIC VEHICLE TIRE

(71) Applicant: CONTINENTAL REIFEN DEUTSCHLAND GMBH, Hannover (DE)

(72) Inventors: Theresia Becker, Duesseldorf (DE); Maike Schulte, Hannover (DE)

(73) Assignee: CONTINENTAL REIFEN DEUTSCHLAND GMBH, Hannover (DE)

( * ) Notice: Subject to any disclaimer, the term of this patent is extended or adjusted under 35 U.S.C. 154(b) by 196 days.

(21) Appl. No.: 15/077,603

(22) Filed: Mar. 22, 2016

(65) Prior Publication Data
US 2016/0272008 A1 Sep. 22, 2016

Related U.S. Application Data

(63) Continuation of application No. 13/579,744, filed as application No. PCT/EP2010/066294 on Oct. 28, 2010, now Pat. No. 9,381,774.

(30) Foreign Application Priority Data

Feb. 19, 2010 (DE) .......................... 10 2010 000471

(51) Int. Cl.
*B60C 9/18* (2006.01)
*B60C 9/22* (2006.01)
(Continued)

(52) U.S. Cl.
CPC .............. *B60C 9/2006* (2013.01); *B60C 9/02* (2013.01); *B60C 9/22* (2013.01); *B60C 9/28* (2013.01);
(Continued)

(58) Field of Classification Search
CPC .... B60C 9/18; B60C 9/20; B60C 9/22; B60C 9/2204; B60C 9/28; B60C 2009/2012; B60C 2009/2019; B60C 2009/2022
See application file for complete search history.

(56) References Cited

U.S. PATENT DOCUMENTS 3,581,794 A * 6/1971 Heuze ...................... B60C 9/20
152/531
3,783,925 A * 1/1974 Boileau ..................... B60C 9/07
152/556
(Continued)

FOREIGN PATENT DOCUMENTS

CA      1209022      8/1986
CN      1248203      3/2000
(Continued)

*Primary Examiner* — Justin R Fischer
(74) *Attorney, Agent, or Firm* — Greenblum & Bernstein, P.L.C.

(57) ABSTRACT

Pneumatic vehicle tire includes a carcass, a belt with at least three belt plies arranged one on top of the other in a radial direction and being arranged radially outside the carcass and a profiled tread arranged radially outside the belt. The at least three belt plies include a radially inner belt ply and a radially outer belt ply are working plies having parallel strength members that are embedded in rubber so that, when viewed in a circumferential direction of the vehicle tire, the strength members of the radially inner belt ply have an opposing axial direction of inclination to the strength members of the radially outer belt ply. A generally zero-degree ply is arranged between and in contact with the two working plies.

3 Claims, 6 Drawing Sheets

(51) Int. Cl.
  *B60C 9/28* (2006.01)
  *B60C 9/20* (2006.01)
  *B60C 9/02* (2006.01)
  *B60C 13/00* (2006.01)
(52) U.S. Cl.
  CPC ...... *B60C 13/00* (2013.01); *B60C 2009/2016* (2013.01); *B60C 2009/2019* (2013.01); *B60C 2009/2022* (2013.01); *B60C 2009/2214* (2013.01); *B60C 2200/06* (2013.01); *Y10T 152/10801* (2015.01)

(56) References Cited

U.S. PATENT DOCUMENTS

| | | |
|---|---|---|
| 4,269,646 A | 5/1981 | Miller |
| 4,446,905 A | 5/1984 | Tamura |
| 4,947,915 A * | 8/1990 | Panikkar .......... B60C 9/20 152/531 |
| 6,367,427 B1 | 4/2002 | Cluzel |
| 6,367,527 B1 | 4/2002 | Cluzel |
| 2006/0225824 A1 | 10/2006 | Kuwajima |
| 2007/0056672 A1 | 3/2007 | Yamanaka |
| 2008/0156410 A1 | 7/2008 | Isobe |
| 2010/0289232 A1 | 11/2010 | Daghini |

FOREIGN PATENT DOCUMENTS

| | | |
|---|---|---|
| CN | 1994763 | 7/2007 |
| EP | 1 795 371 | 6/2007 |
| EP | 1 935 669 | 6/2008 |
| EP | 2 123 482 | 11/2009 |
| FR | 1 437 569 | 5/1966 |
| FR | 2 566 334 | 12/1985 |
| GB | 2 171 067 | 8/1986 |
| JP | 06-286417 | 10/1994 |
| JP | 2009-196548 | 9/2009 |
| WO | WO 09/076970 | 6/2009 |

\* cited by examiner

PNEUMATIC VEHICLE TIRE

CROSS-REFERENCE TO RELATED APPLICATIONS

The instant application is a continuation of U.S. non-provisional application Ser. No. 13/579,744 filed Oct. 28, 2010, which application is U.S. National Stage of International Patent Application No. PCT/EP2010/066294 filed Oct. 28, 2010 and published as WO2011/101046 on Aug. 25, 2011, and claims priority under 35 U.S.C. §§ 119(a) and 365 of German Patent Application No. 10 2010 000 471.5 filed Feb. 19, 2010.

BACKGROUND OF THE INVENTION

1. Field of the Invention

The invention relates to a pneumatic vehicle tire, in particular for utility vehicles, having a carcass, a belt which is constructed radially outside the carcass and a profiled tread which is constructed radially outside the belt on the belt. The belt is formed from at least three belt plies arranged lying one on top of the other from the radial inside to the radial outside, and the radially inner belt ply and the radially outer belt ply are working plies with parallel strength members, in particular made of steel, which are embedded in rubber. When viewed in the circumferential direction U of the vehicle tire, the strength members of the one working ply have an opposing axial direction of inclination to the strength members of the other working ply. Further, the belt ply which is arranged between these two working plies is a belt ply which is embodied or formed as a zero-degree ply with parallel strength members which are embedded in rubber and which enclose in their orientation an angle β where $0°≤β≤5°$ with respect to the circumferential direction U.

2. Discussion of Background Information

Conventional pneumatic tires for utility vehicles usually have a four-ply belt with what is referred to as a triangular configuration in which two working plies are arranged one on top of the other in the radial direction, the steel cords of which are at an angle of approximately 18° to 30° with respect to the circumferential direction. The steel cords of the one working ply and those of the second working ply are inclined in different axial directions A. As a result, the working plies form a diagonal assembly. In such belts there is usually a belt ply embodied or formed as a barrier ply which is located under the working plies, the steel cords of which are at an angle of 50° to 65° with respect to the circumferential direction, as a result of which the cords of the working plies and of the barrier ply form a triangular assembly. In addition, usually an additional protective ply which forms the fourth belt ply is formed above the two working plies, the steel cords of which protective ply are also at an angle of approximately 15° to 30° with respect to the circumferential direction of the vehicle tire. Such belts have a limited circumferential strength. The possibility of moving the belt edges, which this provides, can have an adverse effect on the durability of the tire. The belt can also be subject to radial expansion during operation. This growth can lead to excessive unequal wear of the tire.

It is also known to form pneumatic tires for utility vehicles with a four-ply arrangement with a radially inner barrier ply with steel cords which enclose an angle of approximately 50° to 65° with respect to the circumferential direction, with two working plies which are formed over the barrier ply and which form in a conventional way a diagonal assembly of their steel cords with an orientation of the steel cords of in each case approximately 18° to 30°, and with a fourth belt ply which is formed radially outside the two working plies on the outer working ply and which is embodied or formed as what is referred to as a 0°-ply. The strength members are composed of steel cords and are oriented essentially in the circumferential direction with an angle of 0° to 2.5° with respect to the circumferential direction. In such formations, the circumferential strength of the belt is increased, which has a positive effect on the durability of the belt. However, the influence of the 0°-ply is limited essentially to the radially outer working ply. However, the inner working ply is formed with residual mobility, still with adverse effects on the durability and wear.

Furthermore, occasionally a formation of a pneumatic tire for a utility vehicle with a belt arrangement in which a 0°-ply is formed radially between the two working plies has been proposed. The two working plies continue to be formed in the diagonal assembly in these proposed embodiments and their steel cords are oriented with angles of, in each case, approximately 18° with respect to the circumferential direction. Although this embodiment permits a high level of circumferential strength and improved durability and an improved wear performance compared to a conventional pneumatic tire for a utility vehicle, the durability is still limited with such an embodiment since large shearing forces occur between the three plies as a result of the very acute angles of the strength members which are respectively formed both between the outer working ply and the 0°-ply and between the 0°-ply and the lower working ply. These shearing forces can have a direct adverse effect on the durability of this ply configuration.

SUMMARY OF THE EMBODIMENTS

Embodiments of the invention provide a pneumatic vehicle tire, in particular for utility vehicles, with at least three belt plies in which improved durability is made possible in a simple way despite good wear behavior.

Accordingly, embodiments are directed to a pneumatic vehicle tire, in particular for utility vehicles, having a carcass, a belt which is constructed radially outside the carcass and a profiled tread which is constructed radially outside the belt on the belt. The belt is formed from at least three belt plies arranged lying one on top of the other from a radial inside to a radial outside. The radially inner belt ply and the radially outer belt ply are working plies with parallel strength members, in particular made of steel, which are embedded in rubber, so that, when viewed in the circumferential direction U of the vehicle tire, the strength members of the one working ply have an opposing axial direction of inclination to the strength members of the other working ply. The belt ply which is arranged between these two working plies is a belt ply which is embodied or formed as a zero-degree ply with parallel strength members embedded in rubber that enclose in their orientation an angle β where $0°≤β≤5°$ with respect to the circumferential direction U. Moreover, the strength members of one of the two working plies enclose in their orientation an angle α with respect to the circumferential direction U where $10°≤α<45°$, and the strength members of the other of the two working plies enclose in their orientation an angle γ with respect to the circumferential direction U with $45°≤γ≤90°$.

In this embodiment, a high level of circumferential strength of the belt is made possible by way of the 0°-ply in its position between the two working plies to decouple the two working plies, and to directly influence the two working plies. As a result of this arrangement, the mobility of the belt ply edges is respectively impeded and the growth of the belt is also counteracted in the region which is critical for this between the center of the belt and the belt edges. The formation of the one belt ply with an angle α of its strength members where 10°≤α<45° and the other working ply with the orientation of its strength members with an angle γ with respect to the circumferential direction where 45°≤γ≤90° gives rise to a significant reduction in the shearing forces acting between the working plies. As a result, a good degree of durability of the belt is made possible despite good wear.

The embodiment of a pneumatic vehicle tire according to the invention is particularly advantageous. The working ply having the strength members which in their orientation enclose the angle α with respect to the circumferential direction U is the radially outer of the two working plies, and the working ply having the strength members which in their orientation enclose the angle γ with respect to the circumferential direction U is the radially inner of the two working plies. In this way, the shearing forces between the carcass and the radially inner working ply are reduced and the radially outer working ply with its angle α provides particular protection against puncturing.

The embodiment of a pneumatic vehicle tire according to the invention is particularly advantageous for achieving a particularly uniform wear pattern. The working ply having the strength members which in their orientation enclose the angle γ with respect to the circumferential direction U is the radially outer of the two working plies, and the working ply having the strength members which in their orientation enclose the angle α with respect to the circumferential direction U is the radially inner of the two working plies.

The embodiment of a pneumatic vehicle tire according to the invention is particularly advantageous. A further belt ply having parallel strength members embedded in rubber is formed radially outside the radially outer working ply on the outer working ply. In this way, the additional outer belt ply can further increase the protection against puncturing.

The embodiment of a pneumatic vehicle tire according to the invention is particularly advantageous. The further belt ply is embodied or formed as a zero-degree ply whose strength members enclose in their orientation an angle δ with respect to the circumferential direction U of the pneumatic vehicle tire. In this way, the circumferential forces are substantially distributed between two belt plies. As a result, cord breaks can be additionally counteracted when possible excessively high loads occur during use of the tire.

The embodiment of a pneumatic vehicle tire according to the invention is particularly advantageous, wherein the strength members of the additional belt ply enclose in their orientation an angle δ with respect to the circumferential direction U of the pneumatic vehicle tire where 5°<δ≤90°. The shearing strength which is used in this way has a positive effect on achieving a uniform wear pattern.

The embodiment of a pneumatic vehicle tire according to the invention is particularly advantageous. A further belt ply having parallel strength members embedded in rubber is formed radially inside the radially inner working ply between the carcass and the radially inner working ply. The strength members of the further belt ply enclose in their orientation an angle ε with respect to the circumferential direction U of the pneumatic vehicle tire, in particular where 45°≤ε≤90°, because the additionally formed barrier ply provides an optimum force flux from the carcass into the belt formed from the belt plies and also reduces the movement of the working plies and therefore further improves the durability.

The embodiment of a pneumatic vehicle tire according to the invention is particularly advantageous. The zero-degree ply arranged radially between the two working plies is made smaller in its axial extent in the pneumatic vehicle tire, in particular at least 10 mm smaller, than each of the two working plies, which permits increased durability of the zero-degree ply.

The embodiment of a pneumatic vehicle tire according to the invention is particularly advantageous. Both axial ends of the zero-degree ply end within the axial extent region of each of the two working plies. As a result, the mobility of the edges of the zero-degree ply is further restricted and the durability of the ply can be further improved.

The embodiment of a pneumatic vehicle tire according to the invention is particularly advantageous. The radially outer of the two working plies is made smaller in its axial extent in the pneumatic vehicle tire than the radially inner of the two working plies. In particular, both axial sides of the radially outer of the two working plies end within the axial extent region of the radially inner of the two working plies. This can avoid a situation in which the outer working ply is subjected to a large amount of movement in the region of the shoulders. The durability can therefore be further improved.

The embodiment of a pneumatic vehicle tire according to the invention is particularly advantageous. The strength members of the working plies are strength members made of steel. This promotes further a high level of circumferential strength, good durability and uniform wear.

The embodiment of a pneumatic vehicle tire according to the invention is particularly advantageous. The strength members of the zero-degree ply/plies are strength members made of steel. This further promotes a high level of circumferential strength, good durability and uniform wear.

The embodiment of a pneumatic vehicle tire according to the invention is particularly advantageous. The strength members are at least the zero-degree ply high-elongation cord arranged between the two working plies. As a result, the raising of the belt in the construction process can be made easily possible.

The embodiment of a pneumatic vehicle tire according to the invention is particularly advantageous. The strength members of the additional belt ply are strength members made of steel, since this easily promotes good protection against puncturing.

Embodiments of the invention are directed to a pneumatic vehicle tire that includes a carcass, a belt, including at least three belt plies arranged one on top of the other in a radial direction, that is arranged radially outside the carcass, and a profiled tread arranged radially outside the belt. The at least three belt plies include a radially inner belt ply and a radially outer belt ply as working plies having parallel strength members that are embedded in rubber so that, when viewed in a circumferential direction of the vehicle tire, the strength members of the radially inner belt ply have an opposing axial direction of inclination to the strength members of the radially outer belt ply. The at least three belt plies also include a generally zero-degree ply arranged between the two working plies. The generally zero-degree ply has parallel strength members that are embedded in rubber and oriented at angle β to the circumferential direction in which 0°≤β≤5°. The strength members of one of the two working plies are oriented at an angle α to the circumferential direction in which 10°≤α≤45°, and the strength members of an other of the two working plies are oriented at an angle γ to the circumferential direction in which 45°≤γ≤90°.

According to embodiments of the instant invention, the pneumatic vehicle tire can be structured for utility vehicles.

In accordance with other embodiments, the profiled tread can be arranged on the belt.

According to still other embodiments, the parallel strength members for the working plies may include steel.

Moreover, the one working ply in which the strength members are oriented at the angle $\alpha$ to the circumferential direction can be the radially outer belt ply, and the other working ply in which the strength members are oriented at the angle $\gamma$ to the circumferential direction can be the radially inner belt ply.

Still further, the other working ply in which the strength members are oriented at the angle $\gamma$ to the circumferential direction may be the radially outer belt ply, and the one working ply in which the strength members are oriented at the angle $\alpha$ to the circumferential direction may be the radially inner belt ply.

According to other embodiments of the invention, the belt can further include an additional belt ply having parallel strength members that are embedded in rubber. The further belt ply can be arranged radially outside the radially outer belt ply. Further, the additional belt ply can be arranged on the radially outer belt ply. The additional belt ply may be a generally a zero-degree ply, in which the strength members are oriented at an angle $\delta$ to the circumferential direction in which $0° \leq \delta \leq 5°$. Alternatively, the strength members of the additional belt ply can be oriented an angle $\delta$ to the circumferential direction in which $5° < \delta \leq 90°$.

In accordance with still other embodiments of the invention, the belt may further include another belt ply having parallel strength members that are embedded in rubber. The another belt ply can be arranged radially inside the radially inner belt ply and between the carcass and the radially inner belt ply. The strength members of the another belt ply can be oriented at an angle $\epsilon$ to the circumferential direction in which $45° \leq \epsilon \leq 90°$.

Moreover, an axial extent of the generally zero-degree ply arranged radially between the two working plies may be smaller than an axial extent for each of the two working plies. The axial extent of the generally zero-degree ply can be at least 10 mm smaller than the axial extent for each of the two working plies. Further, both axial ends of the generally zero-degree ply end within an axial extent region of each of the two working plies.

In embodiments, an axial extent of the radially outer belt ply can be smaller than an axial extent of the radially inner belt ply.

According to embodiments, both ends of the radially outer belt ply can end within an axial extent region of the radially inner belt ply.

In other embodiments of the invention, the strength members of the generally zero-degree ply can include steel.

In still other embodiments, the strength members of the generally zero-degree ply and of the additional ply may include steel.

According to still other embodiments, the strength members of at least the generally zero-degree ply arranged between the two working plies may include high-elongation cord (HE).

In further embodiments of the invention, the strength members of the additional belt ply can include steel.

In accordance with still yet other embodiments of the present invention, the belt including the additional belt ply can further include another belt ply having parallel strength members that are embedded in rubber, the another belt ply being is arranged radially inside the radially inner belt ply and between the carcass and the radially inner belt ply, and the strength members of the another belt ply can be oriented at an angle $\epsilon$ to the circumferential direction in which $45° \leq \epsilon \leq 90°$.

BRIEF DESCRIPTION OF THE DRAWINGS

The invention will be explained below with reference to the exemplary embodiments of a pneumatic tire for a utility vehicle of a radial design which is illustrated in FIG. 1 to FIG. 6. In the drawings.

DETAILED DESCRIPTION OF THE EMBODIMENTS

Figure 1:
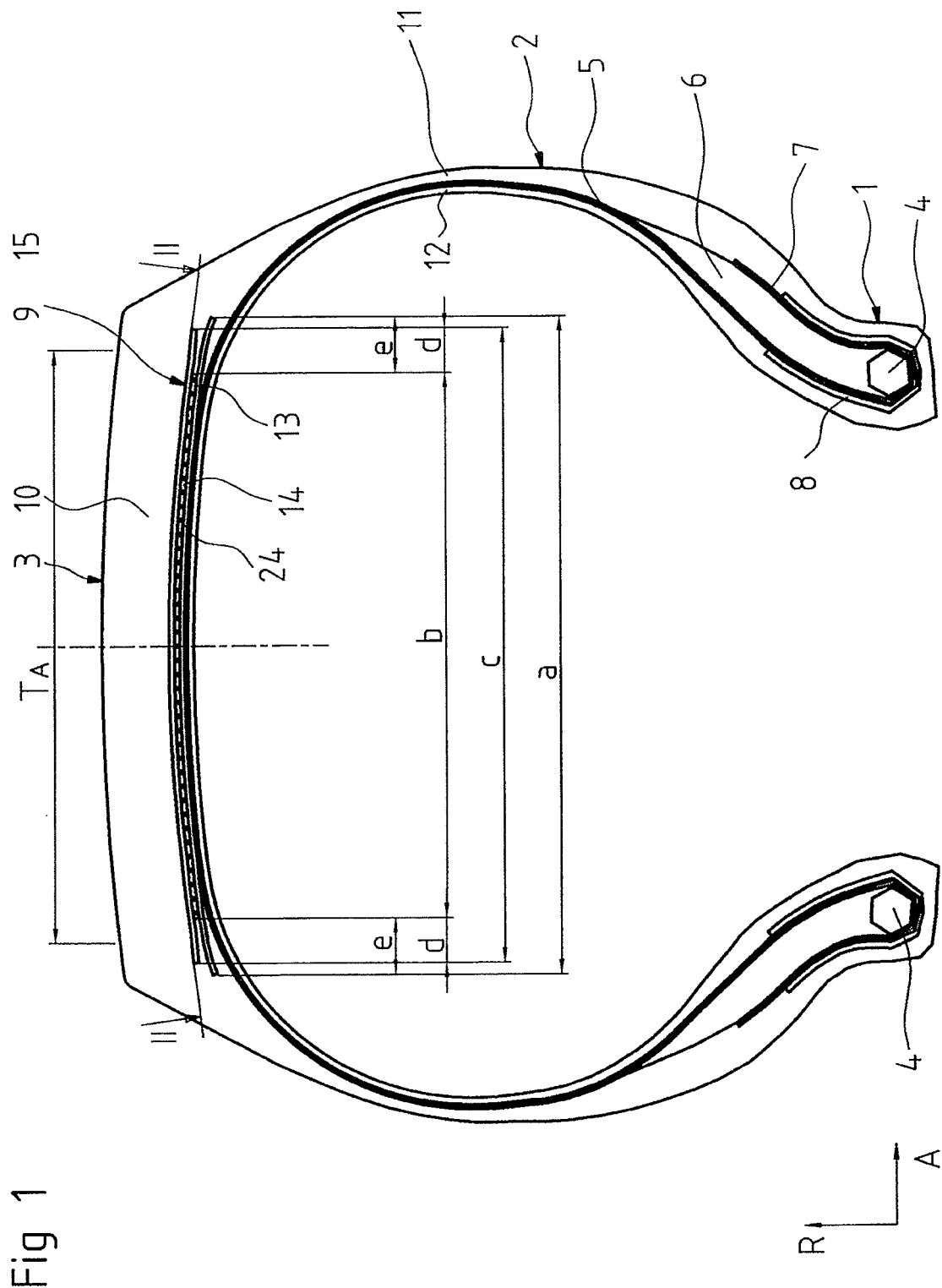
FIG. 1 shows a cross-sectional illustration of a pneumatic vehicle tire of a radial design for utility vehicles.
Figure 2:
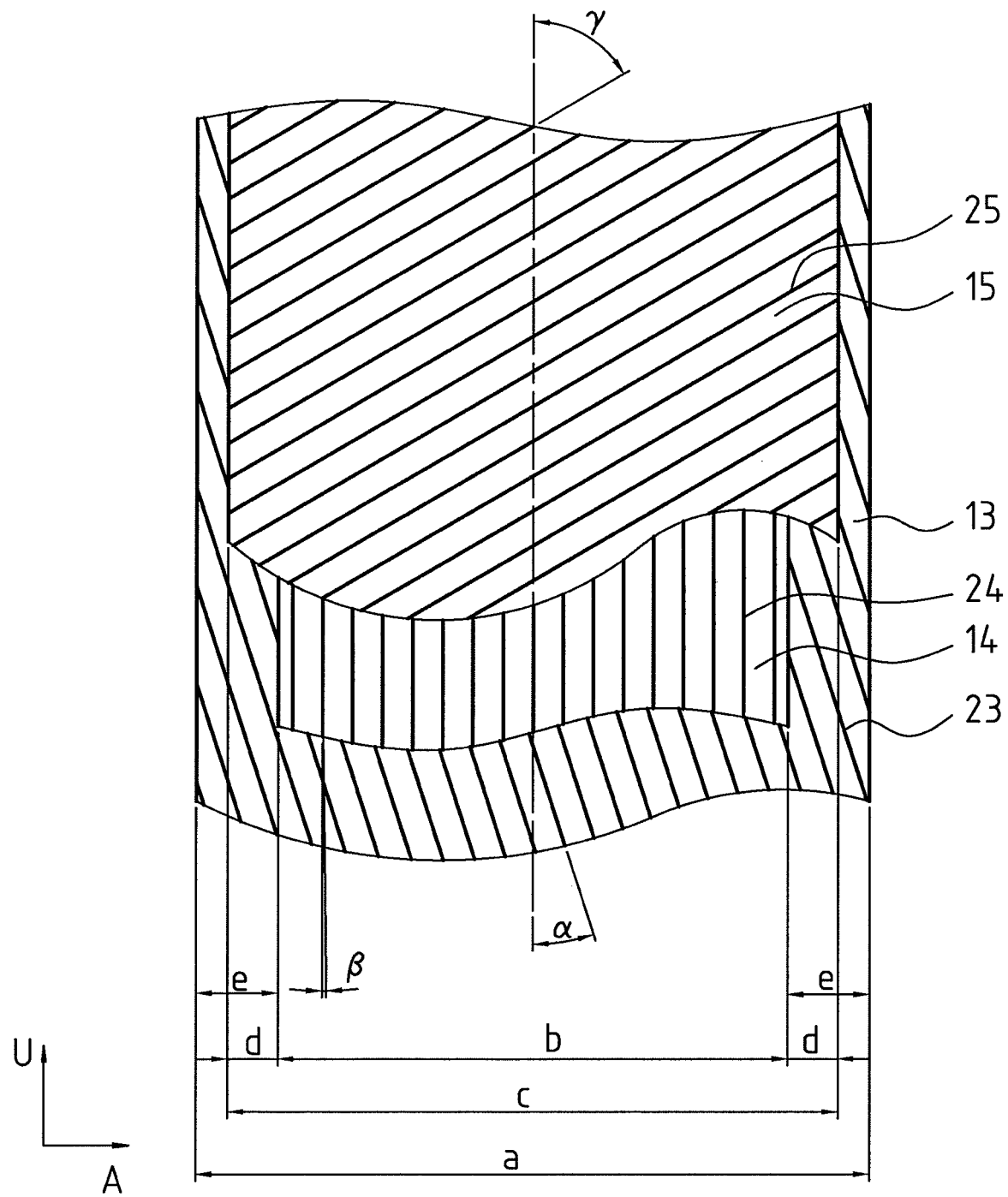
FIG. 2 shows a plan view of the belt from FIG. 1 according to section II-II of FIG. 1 in which all the other components of the tire are not illustrated for the sake of simplification.

FIG. 1 and FIG. 2 show a pneumatic tire of radial design for a utility vehicle with two side walls 2 which are extended in the radial direction R of the vehicle tire and a crown region 3 which is formed axially between side walls 2. The side walls 2 are each formed with a bead region 1 on their extent end pointing inward in the radial direction. In bead region 1, a bead core 4 of a known design is formed, which has high tensile strength in the circumferential direction U and extends in the circumferential direction U. The bead cores 4 are formed wound in a known fashion from wire which extends in the circumferential direction U of the pneumatic vehicle tire and is embedded in rubber. An apex 6 which is triangular in cross section is formed from a hard rubber material on the bead cores 4. The pneumatic vehicle tire is formed with a carcass 5 which, starting from the bead core 4 formed in the left-hand bead region 1 of the pneumatic vehicle tire, extends outward in the radial direction R of the pneumatic vehicle tire through the left-hand side wall 2 as far as the crown region 3, and in the crown region 3 extends in the axial direction A of the pneumatic vehicle tire to the right-hand side wall 2, and in the right-hand side wall 2 of the pneumatic vehicle tire extends radially inward as far as the bead core 4 formed in the bead region 1 of the right-hand side wall 2. The carcass 5 is formed as a folded-over part 7 extending radially outward in both core regions 1. In each case, folded-over part 7 extends along the axial inner side of the bead core 4 to extend in the axial direction along the radial inner side of the bead core 4 to extend along the axial outer side of the bead core 4. The carcass 5 extends with its folded-over part 7 along the axial outer side of the apex 6 and ends on the axial outer side of the apex 7. The carcass 5 is formed, in a way which is known but not illustrated in more detail, from a carcass ply which extends in the circumferential direction U over the entire circumference of the pneumatic vehicle tire and has parallel cords— for example steel cords—which are embedded in rubber and extend essentially in the radial direction R in the region of the side walls 2 and essentially in the axial direction A in the crown region. An inner layer 12 composed of known, particularly air-impermeable rubber material, extends from the left-hand bead region 1 to the right-hand bead region 1 on the side of the carcass 5 pointing to or oriented toward the inside of the tire. An additional bead reinforcing strip 8, which extends in the circumferential direction over the pneumatic vehicle tire is respectively formed in the bead region 1 on the side of the carcass 5 pointing away from the bead core 4. The bead reinforcing strip 8 is, for example, a material strip which is embedded in rubber and composed of parallel strength members of a textile or metallic design.

A belt 9 is formed, which extends over and around the entire circumference of the pneumatic vehicle tire in the circumferential direction U and in the axial direction A from the left-hand tire shoulder to the right-hand tire shoulder in the region of the tire crown 3 radially outside of and on the carcass 5. The belt 9 is formed from three belt plies 13, 14 and 15 which are arranged resting on one another and above one another in the radial direction R. A profiled tread 10 of a known design is formed radially outside of and on belt 9 in order to extend over and around the entire circumference of the pneumatic vehicle tire in the circumferential direction U and in the axial direction A from the left-hand tire shoulder to the right-hand tire shoulder to completely cover the belt 9. In the region of the tire side walls 2, a side wall rubber strip 11, which extends in the radial direction R from the bead region 1 as far as the profiled tread 10 in the crown region 3, is formed in a known fashion on the side of the carcass 5 pointing or oriented away axially from the tire interior.

The radially inner belt ply 13 and the radially outer belt ply 15 are embodied or formed as working plies of the tire and each extends in the circumferential direction U over and around the entire circumference of the pneumatic vehicle tire and in the axial direction A from the left-hand tire shoulder to the right-hand tire shoulder. The working ply 13 is formed from a ply of thread-shaped parallel strength members 23, which are embedded in rubber to extend essentially linearly over the entire width a, measured in the axial direction A, and to enclose an angle α of inclination with respect to the circumferential direction U, where 10°≤α≤45°. The working ply 15 is formed from a ply of thread-shaped parallel strength members 25, which are embedded in rubber to extend essentially linearly over the entire axial width c of the belt ply 15 and to enclose an angle γ of inclination with respect to the circumferential direction U, where 45°≤γ≤90°. The direction of inclination of the strength members 25 of the working plies 15 viewed in the circumferential direction U is formed or oriented in the opposite axial direction A to the direction of inclination of the strength members 23 of the working ply 13. The third belt ply 14, which is formed between the two working plies 15 and 13, extends in the circumferential direction U over and around the entire circumference of the pneumatic vehicle tire and in the axial direction from the left-hand tire shoulder to the right-hand tire shoulder and is embodied or formed as a 0°-ply. For this purpose, the belt ply 14 is formed from parallel thread-shaped strength members which are embedded in rubber and which extend linearly over the entire circumference of the pneumatic vehicle tire enclosing an angle β where 0°≤β≤5° with respect to the circumferential direction U and are therefore oriented essentially in the circumferential direction U of the pneumatic vehicle tire. All three belt plies 13, 14 and 15 extend on both axial sides, in each case as far as a position in the respective tire shoulder which lies axially outside the latch area—represented by the axial width Ta. Over its entire axial extent, the belt ply 14 is in direct contact both with the working ply 13 arranged under it and with the working ply 15 arranged above it.

The 0°-ply 14 extends in the axial direction A over an axial width b, the lower working ply 13 extends in the axial direction A over an axial width a, and the upper working ply 15 extends in the axial direction A over an axial width c in the tire where a>c>b. In this context, the inner working ply 13 extends by an axial extent length e on both axial sides of the 0°-ply 14 beyond the axial position of the respective belt edge of the 0°-ply 14. Likewise, the outer working ply 15 extends by an axial extent length d in each of the two axial directions beyond the axial position of the respective belt edge of the 0°-ply 14. For the extent lengths e and d of this protruding portion the following applies: e>d. The dimension d is embodied or formed here as d≥10 mm. The dimension e in the exemplary embodiment is embodied or formed as e≥60 mm. The two working plies 13 and 15 are not in contact in the region of the protruding portion either.

The strength members 23 and 25 are steel cords of a known type. In one embodiment the strength members 24 are steel cords of a known type. In another embodiment, the strength members 24 are steel cords which are embodied or formed in a known fashion as high-elongation cord (HE cord). Such highly extendable high-elongation cords have a modulus of elasticity under strain between 0% and 2%, which is lower than their modulus of elasticity under strain of more than 2%.

In one exemplary embodiment, the following are selected: β=1°, α=20°, γ=60°, d=11 mm and e=15 mm.

In an alternative embodiment (not illustrated), the inner working ply 13 is respectively embodied or formed with its strength members 23 with the relatively large angle γ of inclination with respect to the circumferential direction U where 45°≤γ≤90° and the outer working ply 15 with strength members 25 is embodied or formed with the relatively small angle α of inclination where 10°≤α<45°.

Figure 3:
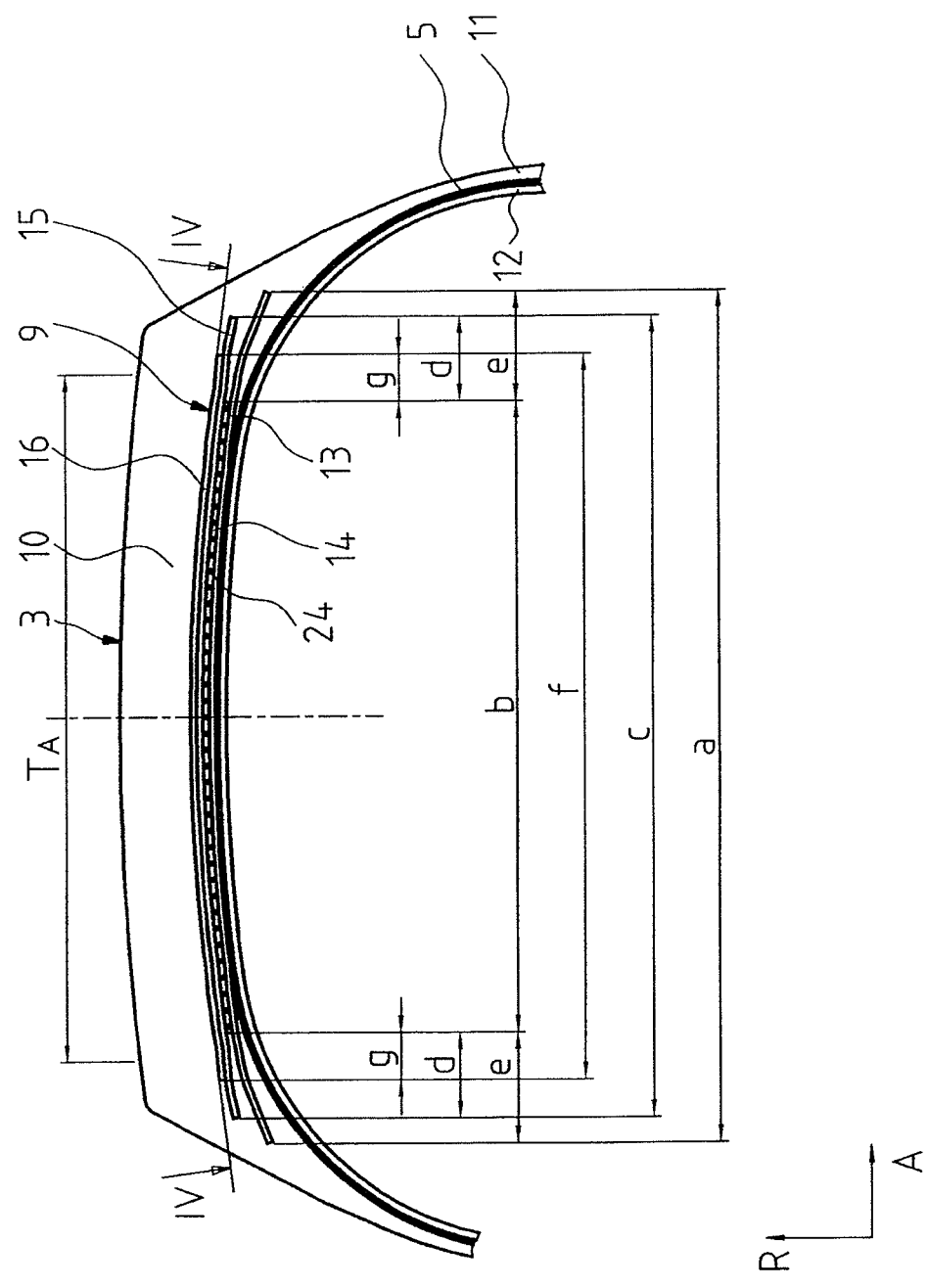
FIG. 3 shows a cross-sectional illustration of a detail of a pneumatic vehicle tire in a way which is analogous to the illustration in FIG. 1 with an alternative belt embodiment, all the other components of the tire are not illustrated for the sake of simplification.
Figure 4:
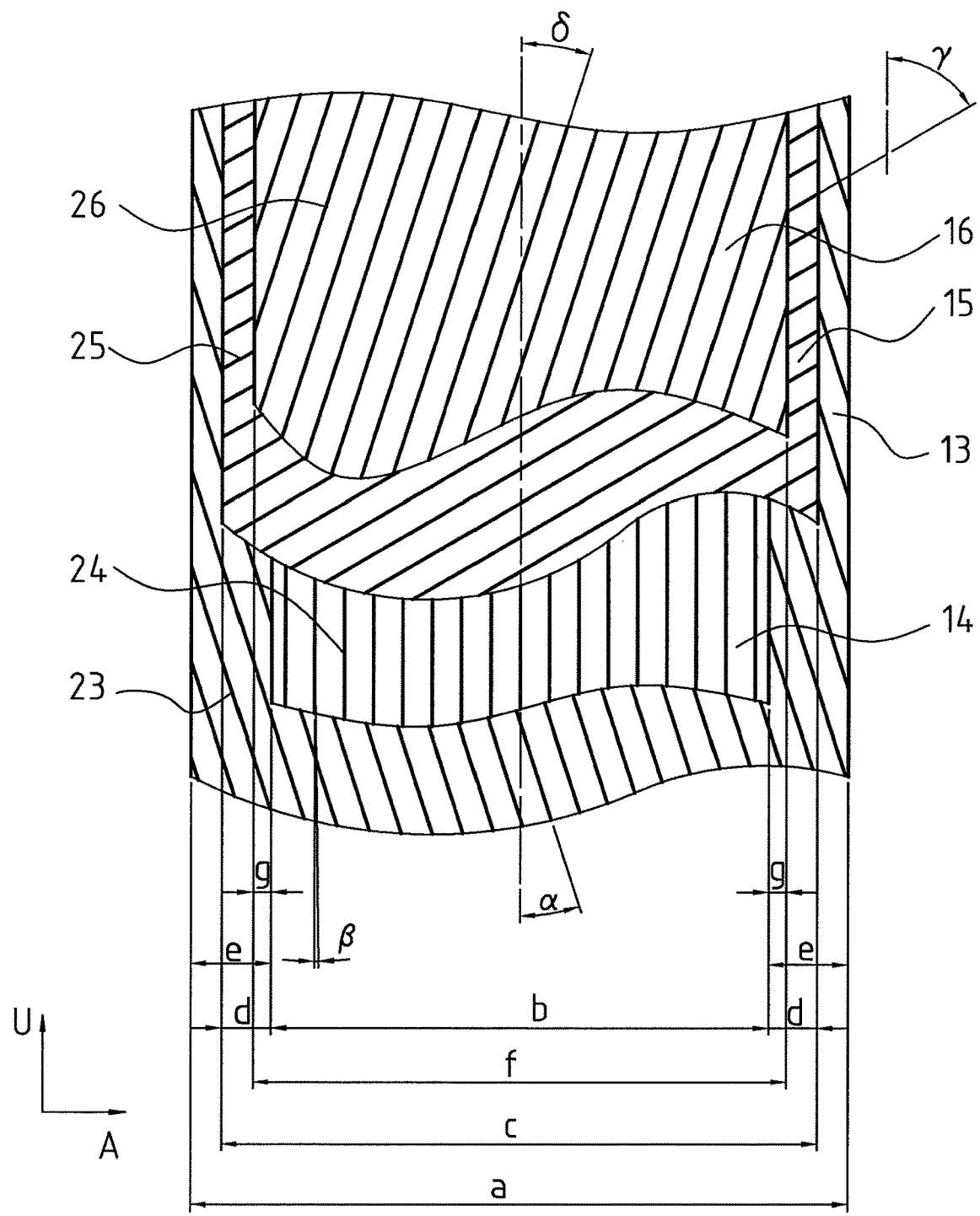
FIG. 4 shows a plan view of the belt from FIG. 3 according to section IV-IV in FIG. 3 in which all the other components of the tire are not illustrated for the sake of simplification.

FIG. 3 and FIG. 4 show a further alternative embodiment in which the belt 9 is embodied or formed with an additional belt ply 16 in addition to the belt plies 13, 14 and 15 illustrated in FIG. 1 and FIG. 2 on the radial outer side of the outer working ply 15. Additional belt ply 16 extends in the circumferential direction U over and around the entire circumference of the pneumatic vehicle tire and in the axial direction A of the pneumatic vehicle tire from the left-hand tire shoulder to the right-hand tire shoulder. The belt ply 16 is formed from a ply of thread-shaped parallel strength members 26, which are embedded in rubber to extend essentially linearly over the entire axial width f of the belt ply 16 and to enclose an angle δ of inclination with respect to the circumferential direction U, where 5°<δ≤90°. The belt ply 16 extends over its entire axial extent in direct contact with the working ply 15 and ends in the axial direction A at its two belt ply edges, in each case in an axial position between the closest belt ply edge of the 0°-ply 14 and the closest belt ply edge of the radially outer belt ply 15 with an axial distance g from the belt ply edge of the 0°-ply 14 where g<d. The width f is the measure of the axial extent of the additional belt ply 16 where b<f<c<a.

The strength members 26 of the belt ply 16 are formed in one exemplary embodiment with the same direction of inclination as the strength members 25 of the working ply 15.

The strength members 26 are steel cords of a known design.

In another embodiment (not illustrated), the additional belt ply 16 is embodied or formed as a 0°-ply and the angle δ of inclination of its strength members 26 which extend over and around the entire circumference of the pneumatic vehicle tire is embodied or formed as 0°≤δ≤5°. When the additional working ply 16 is formed as a 0°-ply, the strength members 26 are embodied or formed as steel cords of a known type. In another embodiment, the strength members 26 of the working ply 16 which is embodied or formed as a 0°-ply are steel cords which are embodied or formed in a known fashion as high-elongation cord (HE cord). Such highly extendable high-elongation cords have a modulus of elasticity under strain between 0% and 2%, which is less than their modulus of elasticity under strain of more than 2%.

In the various abovementioned embodiments with an additional belt ply 16, the radially inner belt ply 13 is also respectively embodied or formed in an alternative embodiment (not shown) with strength members 23 with the relatively large angle γ of inclination with respect to the circumferential direction U, and the radially outer working ply 15 is embodied or formed with strength members 25 with the relatively small angle α of inclination.

Figure 5:
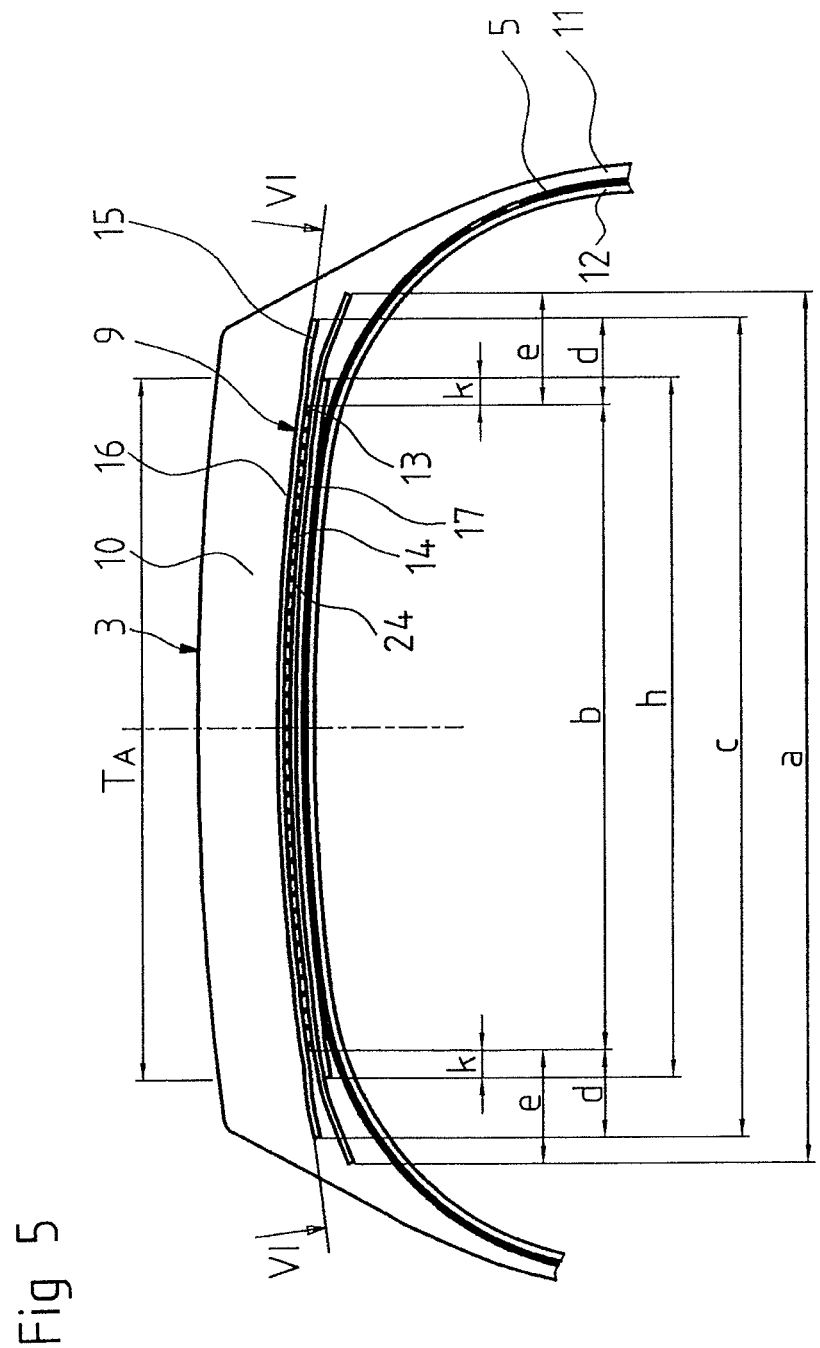
FIG. 5 shows a detail of a cross-sectional illustration of a pneumatic tire in a way which is analogous to the illustration in FIG. 1 with a further alternative embodiment of the belt.
Figure 6:
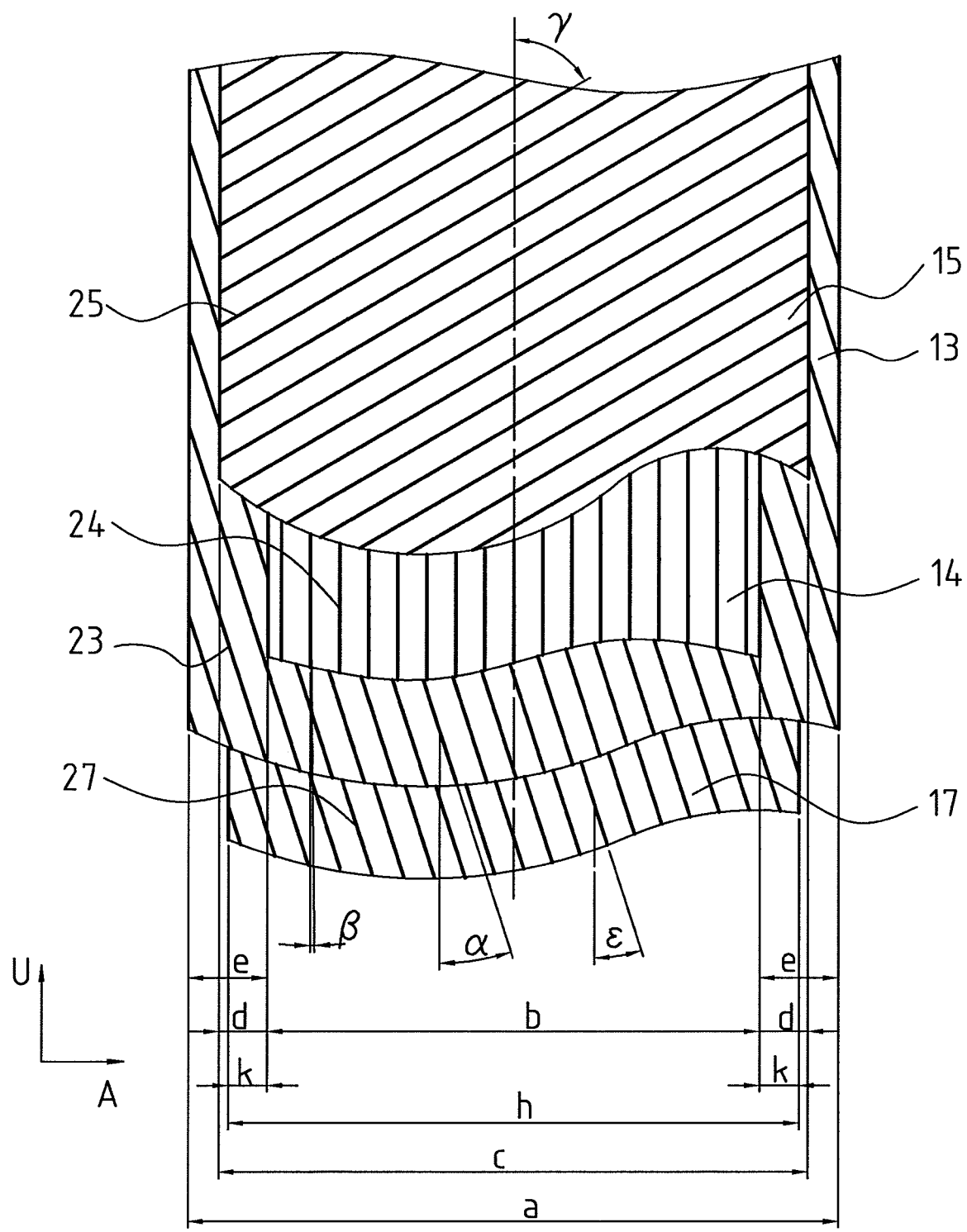
FIG. 6 shows a plan view of the belt from FIG. 5 according to section VI-VI from FIG. 5 in which all the other components of the tire are not illustrated for the sake of simplification.

FIG. 5 and FIG. 6 show a further alternative exemplary embodiment in which, in contrast to the exemplary embodiments illustrated and explained in FIG. 1 and FIG. 2, the belt 9 is additionally embodied or formed with a belt ply 17, which is arranged radially between the radially inner working ply 13 and the carcass 5 to extend in the circumferential direction U over and around the entire circumference of the pneumatic vehicle tire and in the axial direction A of the pneumatic vehicle tire from the left-hand tire shoulder to the right-hand tire shoulder. The belt ply 17 is formed from a ply of thread-shaped parallel strength members 27 embedded in rubber, which extend essentially linearly over the entire axial width h of the belt ply 17 and enclose an angle ε of inclination with respect to the circumferential direction U, where 45°≤ε≤90° for example where ε=50°. The belt ply 17 extends over its entire axial extent in direct contact with the working ply 13 and ends in the axial direction A at its two belt ply edges, in each case in an axial position between the closest belt ply edge of the 0°-ply 14 and the closest belt ply edge of the radially outer working ply 15 with an axial distance k from the belt ply edge of the 0°-ply 14, where k<d<e. The width h is the measure of the axial extent of the additional belt ply 17, where b<h<c<a.

The strength members 27 of the belt ply 17 are embodied or formed in one exemplary embodiment with the same angle of inclination as the strength members 23 of the radially inner working ply 13.

The strength members 27 are steel cords of a known design.

In the various abovementioned embodiments with an additional belt ply 17, in a further alternative embodiment (not illustrated), the radially inner working ply 13 is also embodied or formed in each case with strength members 23 with the relatively large angle γ of inclination with respect to the circumferential direction U, and the radially outer working ply 15 is embodied or formed with strength members 25 with the relatively small angle α of inclination.

In a further alternative embodiment (not illustrated), in the embodiments with an additional belt ply 16 (illustrated in conjunction with FIG. 3 and FIG. 4), the additional inner belt ply 17 (illustrated in conjunction with FIG. 5 and FIG. 6) is also formed. In this case, the belt 9 is formed from a 5-ply arrangement with the belt plies 17, 13, 14, 15 and 16 arranged one on top of the other from radially inside to radially outside. In these embodiments, the radially inner working ply 13 is also formed with its strength members 23 with, as illustrated graphically in FIG. 2, FIG. 4 and FIG. 6, the relatively small angle γ of inclination, and the radially outer working ply 15 is formed with its strength members 25 with the relatively large angle α of inclination with respect to the circumferential direction. In alternative embodiments, as is respectively explained in conjunction with FIG. 1 to FIG. 6, the radially inner working ply 13 is formed with its strength members 23 with the relatively large angle α of inclination, and the radially outer working ply 15 is formed with its strength members 25 with the relatively small angle γ of inclination.

LIST OF REFERENCE NUMERALS (Part of the description)
1 bead region
2 side wall
3 crown region
4 bead core
5 carcass
6 apex
7 carcass turn-over
8 bead reinforcing strip
9 belt
10 profiled tread
11 side wall rubber strip
12 inner layer
13 belt ply (working ply)
14 belt ply (zero-degree ply)
15 belt ply (working ply)
16 belt ply
17 belt ply
23 strength member
24 strength member
25 strength member
26 strength member
27 strength member

What is claimed:

1. A pneumatic vehicle tire comprising:
a carcass;
a belt, comprising at least three belt plies arranged one on top of the other in a radial direction, being arranged radially outside the carcass; and
a profiled tread arranged radially outside the belt,
wherein the at least three belt plies comprise a radially inner belt ply and a radially outer belt ply are working plies having parallel strength members that are embedded in rubber so that, when viewed in a circumferential direction of the vehicle tire, the strength members of the radially inner belt ply have an opposing axial direction of inclination to the strength members of the radially outer belt ply,
wherein the at least three belt plies comprise a generally zero-degree ply arranged between the two working plies, the generally zero-degree ply having parallel strength members that are embedded in rubber and oriented at an angle β to the circumferential direction in which 0°≤β≤5°, and wherein the strength members of one of the two working plies are oriented at an angle α to the circumferential direction in which $10° \leq α < 45°$, and the strength members of an other of the two working plies are oriented at an angle γ to the circumferential direction in which $45° \leq γ \leq 90°$, further comprising:

an additional belt ply having parallel strength members that are embedded in rubber, the additional belt ply being arranged radially outside the radially outer belt ply; and another belt ply having parallel strength members that are embedded in rubber, the another belt ply being is arranged radially inside the radially inner belt ply and between the carcass and the radially inner belt ply, wherein the another belt ply is arranged directly adjacent the carcass, wherein the strength members of the another belt ply are oriented at an angle ε to the circumferential direction in which $45° \leq ε \leq 90°$, wherein an axial extent of said another belt ply is different from an axial extent of the additional belt ply, wherein an axial extent of the additional belt ply is different from an axial extent of the two working plies and is different from an axial extent of the generally zero-degree ply arranged radially between the two working plies, and wherein an axial extent of the generally zero-degree ply arranged radially between the two working plies is smaller than an axial extent for each of the two working plies.

2. The pneumatic vehicle tire according to the features of claim 1, wherein the axial extent of the generally zero-degree ply is at least 10 mm smaller than the axial extent for each of the two working plies.

3. The pneumatic vehicle tire according to the features of claim 1, wherein both axial ends of the generally zero-degree ply end within an axial extent region of each of the two working plies.

* * * * *